(12) United States Patent
Doi et al.

(10) Patent No.: US 6,685,588 B2
(45) Date of Patent: Feb. 3, 2004

(54) CHAIN INCORPORATING ROLLING BODIES

(75) Inventors: Katsuo Doi, Osaka (JP); Yasushi Nagai, Osaka (JP); Seiji Kitagawa, Osaka (JP)

(73) Assignee: Tsubakimoto Chain Co., Osaka (JP)

( * ) Notice: Subject to any disclaimer, the term of this patent is extended or adjusted under 35 U.S.C. 154(b) by 36 days.

(21) Appl. No.: 10/137,054

(22) Filed: May 1, 2002

(65) Prior Publication Data

US 2002/0173392 A1 Nov. 21, 2002

(30) Foreign Application Priority Data

May 15, 2001 (JP) ........................................ 2001-145062

(51) Int. Cl.[7] .............................................. F16G 13/02
(52) U.S. Cl. ..................................... 474/209; 384/907.1
(58) Field of Search ................................. 474/201, 202, 474/206, 209; 384/490, 492, 565, 907.1

(56) References Cited

U.S. PATENT DOCUMENTS

| | | | | |
|---|---|---|---|---|
| 501,587 A | * | 7/1893 | Gleason ...................... 474/209 |
| 569,632 A | * | 10/1896 | Garrood ...................... 474/209 |
| 2,428,060 A | * | 9/1947 | Albrecht ...................... 474/209 |
| 4,698,825 A | * | 10/1987 | Schieber et al. ............... 373/93 |
| 4,795,408 A | * | 1/1989 | Kotegawa et al. .......... 474/209 |
| 4,915,511 A | | 4/1990 | Kotegawa et al. |
| 5,284,394 A | | 2/1994 | Lemelson |
| 5,322,735 A | * | 6/1994 | Fridez et al. ................ 428/357 |
| 5,780,119 A | * | 7/1998 | Dearnaley et al. .......... 427/528 |
| 5,823,686 A | | 10/1998 | Murano et al. |
| 6,070,711 A | * | 6/2000 | Murano et al. .............. 198/779 |
| 6,102,573 A | | 8/2000 | Morimoto et al. |
| 6,367,982 B1 | * | 4/2002 | Doi et al. ................... 384/565 |

FOREIGN PATENT DOCUMENTS

EP 2001-065558 3/2001

* cited by examiner

Primary Examiner—Thomas R. Hannon
Assistant Examiner—Vicky A. Johnson
(74) Attorney, Agent, or Firm—Howson & Howson

(57) ABSTRACT

In a roller chain in which a plurality of rolling bodies is disposed between a roller and a bushing, between a bushing and a pin, or between a roller and a pin, the rolling bodies include at least one carbon-impregnated ceramic rolling body, or at least one carbon-coated steel rolling body. Preferably, the carbon-impregnated or carbon-coated rolling bodies are disposed in an alternating configuration with steel rolling bodies.

3 Claims, 6 Drawing Sheets ated ceramic, or carbon-coated metallic, rolling body is incorporated in a chain, between a roller and a bushing, between a bushing and a pin therein, or between a roller and a pin therein. The chain can be used at a high temperature by virtue of the self-lubricating properties of carbon at high temperature. Moreover, failure of the chain resulting from the generation of heat due to the rotation of the roller or bushing can be prevented, and therefore the chain can be adapted to high speed operation. Further, since no lubricant is required, the operating cost can be reduced, and cleaning of the chain is easier. Further, because carbon is chemically resistant, it is possible to use the chain in an acidic or alkaline environment.

CHAIN INCORPORATING ROLLING BODIES

BACKGROUND OF THE INVENTION

This invention relates to a chain incorporating a plurality of rolling bodies between a roller and a bushing, between the bushing and a pin, or between the roller and the pin.

Chains incorporating a plurality of metallic rolling bodies between a roller and a bushing, between the bushing and a pin, or between the roller and the pin, are well known. These chains required a lubricant, such as grease or the like, to prevent direct contact between the metallic rolling bodies. However, when the lubricant deteriorates or flows out, direct contact between the rolling bodies causes burning or the like, resulting in failure of the inner and outer plates to bend relative to each other, as required for proper operation of the chain. Thus, periodic replenishment of the lubricant was required.

To solve this problem, a chain incorporating a plurality of rolling bodies between a roller and a bushing has been provided, in which metallic rolling bodies and polyethylene resin rolling bodies were disposed in alternating arrangement, obviating the use of a lubricant such as grease or the like.

However, the chain incorporating alternating metallic and polyethylene resin rolling bodies exhibited two problems. First, since the polyethylene resin is heat-resistant only to a temperature of approximately 90° C., it cannot be used in an environment where temperatures exceeding approximately 90° C are encountered. Second, even when the chain is used at a moderate temperature, when the rate of revolution of the roller reaches about 185 rpm, frictional heat resulting from rotation of the roller causes the temperature of the rolling section to exceed the heat-resisting temperature of the polyethylene resin. As a result, the surface of the polyethylene resin rolling body is fused, and the rolling body cannot rotate smoothly.

SUMMARY OF THE INVENTION

Accordingly, a general object of this invention is to solve the aforementioned problems encountered in the use of conventional roller chains.

Another object of the invention is to provide a chain incorporating rolling bodies that can be used at a high temperature.

According to one aspect of the invention, a chain incorporates a plurality of rolling bodies between a roller and a bushing, and at least one of the plurality of rolling bodies is a carbon-impregnated ceramic rolling body.

According to another aspect of the invention, a chain incorporates a plurality of rolling bodies between a roller and a bushing, and at least one of the plurality of rolling bodies is a carbon-coated metallic rolling body.

According to another aspect of the invention, a chain incorporates a plurality of rolling bodies between a bushing and a pin, and at least one of the plurality of rolling bodies is a carbon-impregnated ceramic rolling body.

According to another aspect of the invention, a chain incorporates a plurality of rolling bodies between a bushing and a pin, and at least one of the plurality of rolling bodies is a carbon-coated metallic rolling body.

According to another aspect of the invention, a chain incorporates a plurality of rolling bodies between a roller and a pin, and at least one of the plurality of rolling bodies is a carbon-impregnated ceramic rolling body.

According to still another aspect of the invention, a chain incorporates a plurality of rolling bodies between a roller and a pin, and at least one of the plurality of rolling bodies is a carbon-coated metallic rolling body.

Thus, according to the invention, a carbon-impregn

BRIEF DESCRIPTION OF THE DRAWINGS

Preferred embodiments of the invention will now be described in detail, by way of example only, with reference to the accompanying drawings, in which.

DETAILED DESCRIPTION OF THE PREFERRED EMBODIMENTS

Embodiments of the invention will be described with reference to drawings.

Figure 1:
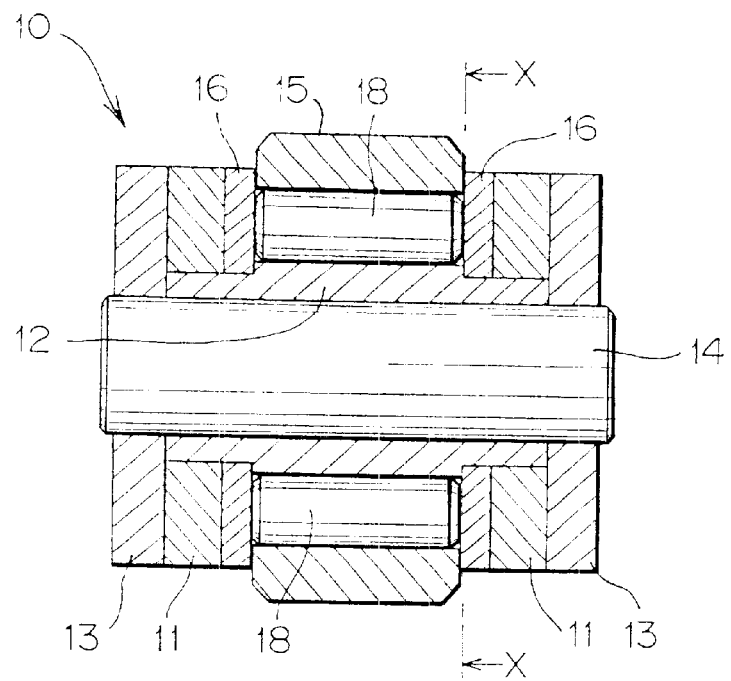
FIG. 1 is a cross-sectional view of the principal portion of a chain according to a first embodiment of the invention.
Figure 2:
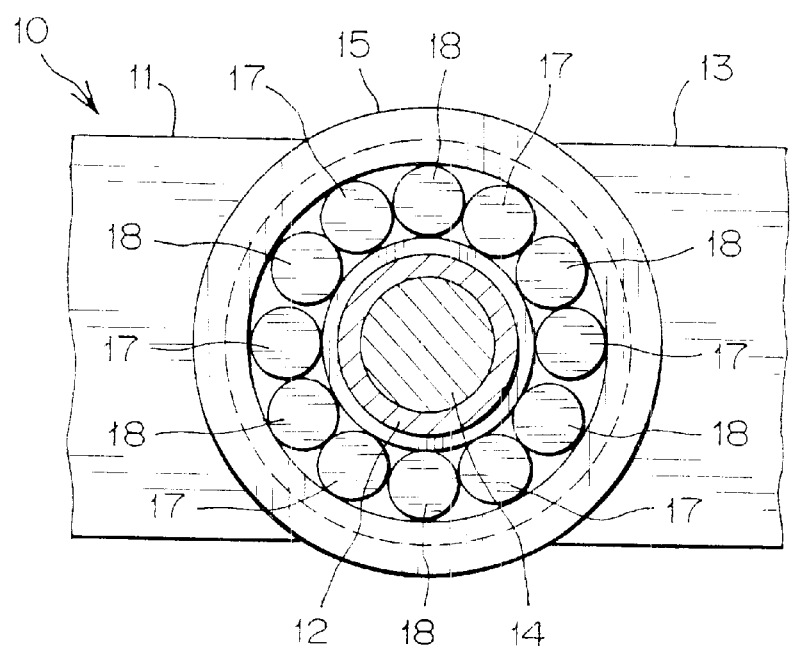
FIG. 2 is a cross-sectional view taken on the plane X—X in FIG. 1.

In a chain 10, shown in FIGS. 1 and 2, a pair of inner plates 11 and a pair of outer plates 13 are provided, the outer plates 13 being disposed outside the pair of inner plates 11. The inner plates 11 are connected by a hollow, cylindrical bushing 12, and the outer plates 13 are connected by a pin 14, which fits into the bushing 12 with a clearance. The inner plates 11 and the pair of outer plates 13 are articulably connected to each other by the pin and bushing. Six cylindrical steel rolling bodies 17, and six carbon-impregnated cylindrical ceramic rolling bodies 18, are disposed in alternating arrangement on an outer circumferential surface of the bushing 12. A steel roller 15 is rotatable on the outer circumferences of the array of cylindrical rolling bodies 17 and 18. In other words, the six cylindrical steel rolling bodies 17 and the six carbon-impregnated cylindrical ceramic rolling bodies 18 are incorporated between the roller 15 and the bushing 12.

Further, annular thrust bearing plates 16 fit onto the outer circumferential surfaces of the bushing 12 respectively between the inner sides of the inner plates 11 and the opposed outer ends of the roller 15. The thrust bearing plates 16 restrict the axial positions of the roller 15 and the cylindrical rolling bodies 17 and 18.

In the chain 10 of the above-described configuration, when the roller 15 rotates, the cylindrical steel rolling bodies 17 and the carbon-impregnated ceramic rolling bodies 18 rotate on the outer circumferential surface of the bushing 12. By virtue of the self-lubricating properties of carbon in the carbon-impregnated ceramic rolling body 18, the roller 15 rotates smoothly without the use of a lubricant. Further, the self-lubricating properties of carbon at high temperature permit the use of the chain in a high temperature environment. In the case of a chain incorporating rolling bodies in which carbon is impregnated into a resin, when the temperature exceeds 350° C., adsorbed water is lost, and the self-lubricating properties are lost. On the other hand, in the case of a chain incorporating carbon-impregnated ceramic rolling bodies 18, the chain can be used even at a temperature of 500° C. Further, even when the roller 15 rotates at high speed, rotation failure due to generation of heat does not occur, and the chain can therefore be adapted to high speed operation. Further, the chemical resistance of the carbon in the carbon-impregnated ceramic rolling bodies 18 permits the chain to be used in acidic or alkaline environments.

With a chain 10 having a construction as described above, smooth rotation of the roller 15 occurs, without the need for periodic oiling of the chain, by virtue of the self-lubricating properties of carbon at high temperature in the carbon-impregnated ceramic cylindrical rolling bodies 18. Accordingly, the chain does not require maintenance, and lubricant such as grease or the like is not needed. Thus, the chain 10 is particularly useful as a conveyor chain in applications such as food processing, where a lubricant cannot be used.

Figure 3:
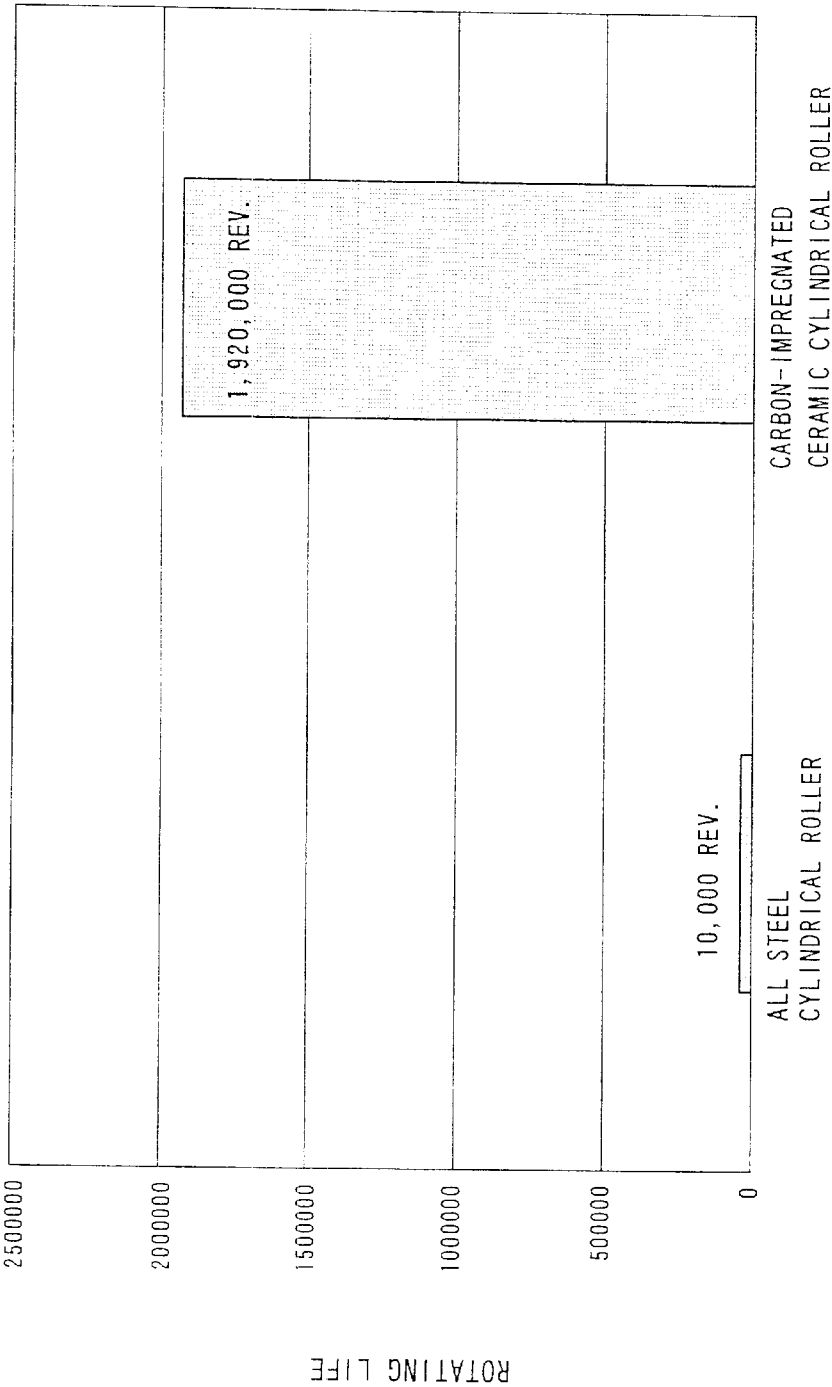
FIG. 3 is a bar graph comparing the rotating life of a roller in a chain according to the first embodiment of the invention and a roller of a conventional chain.

Test comparing the rotating life of the roller in the chain 10 according to the first embodiment of the invention, and the rotating life of the roller in a conventional chain, will now be described. FIG. 3 depicts the rotating life of the roller 15 and the roller of a conventional chain.

The chain used in the test was the chain 10 according to the first embodiment of the invention, in which a cylindrical, steel rolling body and a cylindrical, carbon-impregnated ceramic rolling body were alternately disposed. The diameter of the roller was 50.8 mm. As a comparative example, a conventional chain was used, in which all of the rolling bodies were cylindrical steel rolling bodies. The tests were carried out at a load of 0.59 kN, and a temperature of 300° C.

In the result of the comparison tests, the rolling bodies in the conventional chain reached a rotating life at 10,000 revolutions as shown in FIG. 3. However, the rotating life of the rolling bodies in the chain 10 according to the first embodiment of the invention was 1,920,000 revolutions. The tests showed that the chain 10 according to the first embodiment of the invention had a remarkable advantage over the conventional chain, in that its rolling bodies exhibited a much longer rotating life at high temperature.

Figure 4:
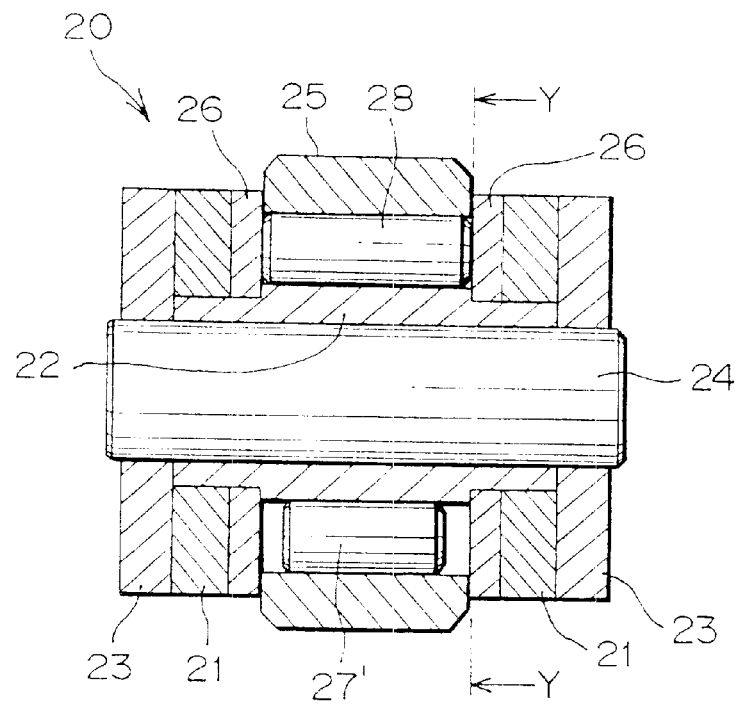
FIG. 4 is a cross-sectional view of the principal portion of a chain according to a second embodiment of the invention.
Figure 5:
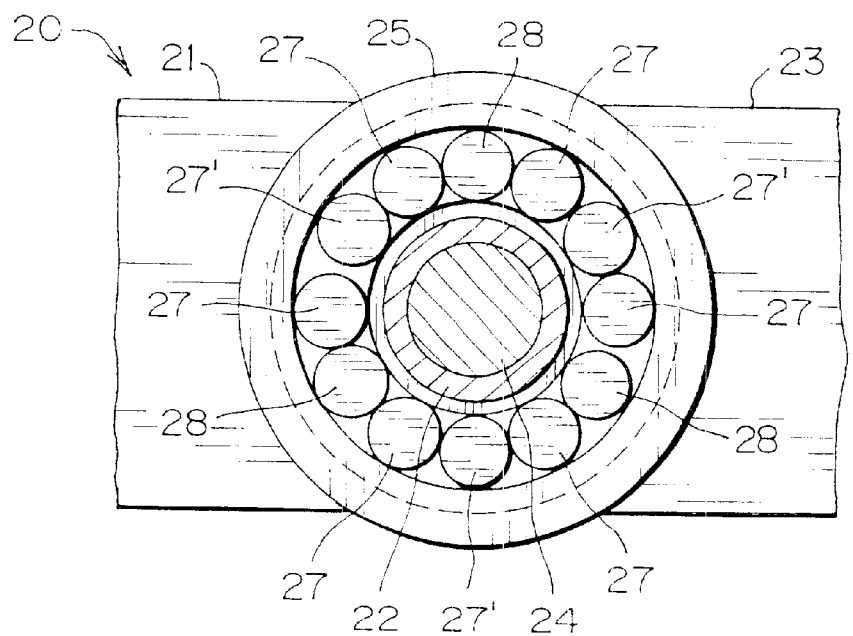
FIG. 5 is a cross-sectional view taken on the plane Y—Y in FIG. 4.

In a chain 20, shown in FIGS. 4 and 5, a pair of inner plates 21 and a pair of outer plates 23 are provided, the outer plates 23 being disposed outside the pair of inner plates 21. The inner plates 21 are connected by a hollow, cylindrical bushing 22, and the outer plates 23 are connected by a pin 24, which fits into the bushing 22 with a clearance. The inner plates 21 and the pair of outer plates 23 are articulably connected to each other by the pin and bushing. Twelve rolling bodies are disposed on an outer circumferential surface of the bushing 22. The rolling bodies include six cylindrical steel rolling bodies 27, three cylindrical steel rolling bodies 27', having a length shorter than that of rolling bodies 27, and three cylindrical, carbon-impregnated ceramic rolling bodies 28. These rolling bodies are disposed in an alternating array as shown in FIG. 5, with each of the ceramic rolling bodies 28 being disposed between two of the longer steel rolling bodies 27. A steel roller 25 is rotatable on the outer circumference of the array of cylindrical rolling bodies 27, 27' and 28. Thus, between the roller 25 and the bushing 22 there are incorporated six longer cylindrical steel rolling bodies 27, three shorter cylindrical steel rolling bodies 27', and three cylindrical, carbon-impregnated, ceramic rolling bodies 28.

Further, annular thrust bearing plates 26 fit onto the outer circumferential surfaces of the bushing 22 respectively between the inner sides of the inner plates 21 and the opposed outer ends of the roller 25. The thrust bearing plates 26 restrict the axial positions of the roller 25 and the cylindrical rolling bodies 27, 27' and 18.

The chain 20 having the above-described configuration has substantially the same actions and effects as in the chain 10 according to the first embodiment of the invention and a detailed explanation thereof is therefore omitted as unnecessary. However, when an axial load is applied to the roller 25, skew (tilting of the cylindrical roller with respect to its proper axis of rotation) is generated in the longer cylindrical steel rolling body 27, or in the cylindrical carbon-impregnated ceramic rolling body 28. However, a circumferential gap between a shorter cylindrical steel rolling body 27' and the adjacent longer cylindrical steel rolling body 27 resolves the skew, and the skew is not transmitted to the remaining steel cylindrical rolling bodies 27 or to the carbon-impregnated ceramic cylindrical rolling bodies 28. As a result, even if the roller 25 rotates under an axial load which tends to cause skew, its rotation is stabilized and the remaining cylindrical steel rolling bodies 27 and the cylindrical, carbon-impregnated ceramic rolling bodies 28 are not displaced in the axial direction, so that the rolling bodies do not abut against the thrust bearing plates 26. Therefore, wear, due to sliding of the end faces of the cylindrical steel rolling bodies 27 or the cylindrical, carbon-impregnated ceramic rolling bodies 28 against the thrust bearing plates 26, can be suppressed.

Resolving the skew of the cylindrical rolling bodies to stabilize the rotation of the roller by incorporating shorter cylindrical rolling bodies has been described in our Japanese Patent Application No. Hei. 11-240072.

The resolution of the skew of the cylindrical roller by utilization of short rolling bodies to stabilize the rotation of the rollers can also be adapted to other embodiments of the invention, including embodiments using ceramic-coated metallic rolling bodies, and embodiments using needle-shaped rolling bodies, as described later.

Figure 6:
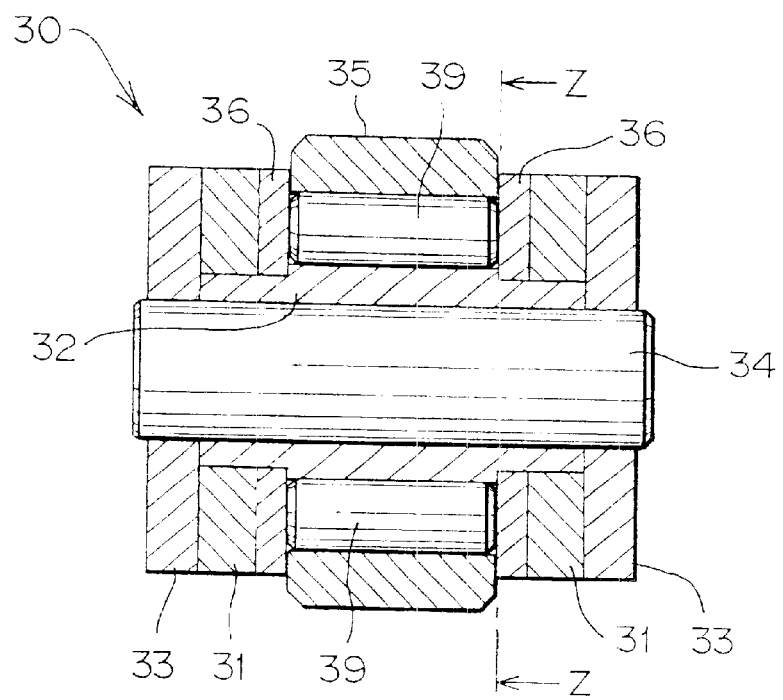
FIG. 6 is a cross-sectional view of the principal portion of a chain according to a third embodiment of the invention.
Figure 7:
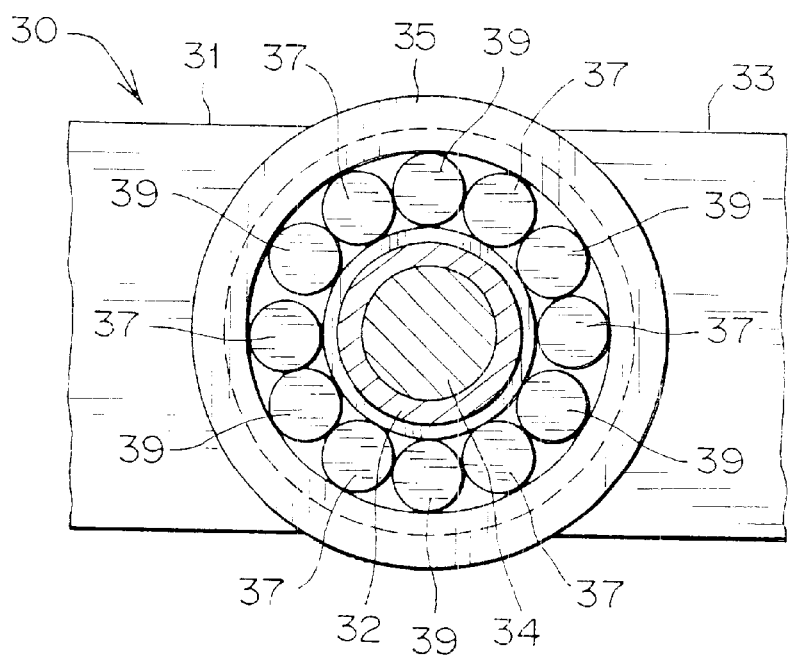
FIG. 7 is a cross-sectional view taken on the plane Z—Z in FIG. 6.

In a chain 30, shown in FIGS. 6 and 7, a pair of inner plates 31 and a pair of outer plates 33 are provided, the outer plates 33 being disposed outside the pair of inner plates 31. The inner plates 31 are connected by a hollow, cylindrical bushing 32, and the outer plates 33 are connected by a pin 34, which fits into the bushing 32 with a clearance. The inner plates 31 and the pair of outer plates 33 are articulably connected to each other by the pin and bushing. Six cylindrical steel rolling bodies 37, and six cylindrical, carbon-coated steel rolling bodies 39, are disposed in alternating arrangement on an outer circumferential surface of the bushing 32. A steel roller 15 is rotatable on the outer circumferences of the array of cylindrical rolling bodies 37 and 39. In other words, the six cylindrical steel rolling bodies 37 and the six carbon-coated cylindrical steel rolling bodies 39 are incorporated between the roller 35 and the bushing 32.

In this case, the carbon-coated steel cylindrical rolling bodies 39 are prepared by adhering carbon to the surface of a steel cylindrical rolling body by vapor deposition. Further, annular thrust bearing plates 36 are fitted onto the outer circumferential surfaces of the bushing 32, respectively between inner sides of the inner plates 31 and the opposed outer ends of the roller 35. The annular thrust bearing plates 36 restrict the axial positions of the roller 35 and the cylindrical rolling bodies 37 and 39.

The chain 30, having the above-described configuration, uses carbon-coated steel cylindrical rolling bodies 39 in place of the carbon-impregnated ceramic cylindrical rolling bodies 18 in the chain 10 according to the first embodiment of the invention.

The chain 30 can be used at a high temperature. However, when the chain 30 is used for a long period of time, the self-lubricating properties of the carbon-coated steel cylindrical rolling bodies can be lost by exfoliation of the carbon film. Thus, the above-mentioned cylindrical, carbon-impregnated, ceramic rolling bodies are preferred over the carbon-coated steel rolling bodies. Otherwise, the chain 30 according to the third embodiment of the invention has substantially the same actions and effects as the chain 10 according to the first embodiment of the invention, and further detailed explanation thereof will be omitted as unnecessary.

Figure 8:
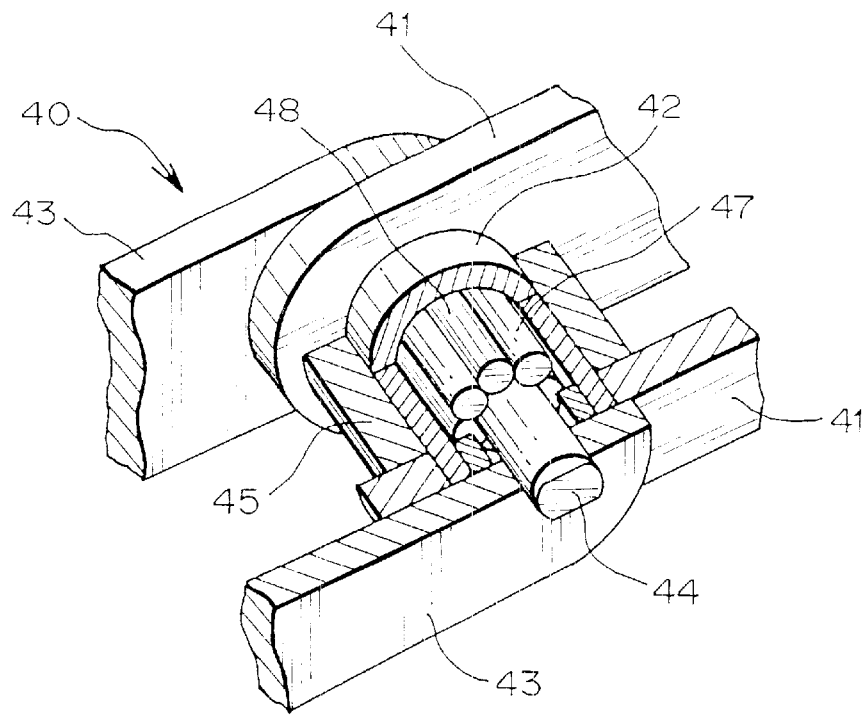
FIG. 8 is a partially cut-away perspective view of the principal portion of a chain according to a fourth embodiment of the invention.

In the chain 40 shown in FIG. 8, inner plates 41 are connected by a hollow, cylindrical bushing 42, and outer plates 43 are disposed outside the inner plates 41, and connected by a pin 44 that extends through the bushing 42. Four needle-shaped, steel rolling bodies 47 and four carbon-impregnated, needle-shaped, ceramic rolling bodies 48 are disposed in an alternating array on an outer circumferential surface of the pin 44. The bushing 42 fits on the outer circumferences of the array of needle-shaped rolling bodies 47 and 48, and a steel roller 45 fits rotatably on the outer circumferential surface of the bushing 42. In other words, four needle-shaped, steel rolling bodies 47 and four needle-shaped, carbon-impregnated, ceramic rolling bodies 48 are incorporated between the bushing 42 and the pin 44. The pair of inner plates 41 and the pair of outer plates 43 are articulably connected to each other by the structure comprising the pin, the bushing and the needle-shaped rolling bodies.

In the chain 40 as just described, since the four needle-shaped, steel rolling bodies 47 and the four needle-shaped, carbon-impregnated, ceramic rolling bodies 48 are incorporated between the bushing 42 and the pin 44, the bending motion between the inner and outer plates is smooth, and because of the self-lubricating properties of carbon in the carbon-impregnated ceramic cylindrical rolling bodies 48, a lubricant is not required. Further, the self-lubricating properties of carbon in the needle-shaped, carbon-impregnated, ceramic rolling bodies 48 at high temperature permits the use of the chain in a high temperature environment. Further, the chemical resistance of carbon in the cylindrical, carbon-impregnated, ceramic rolling bodies 48, allows the chain to be used in an acidic or alkaline environment.

With a chain 40 having a construction as described above, the bending motion between the inner and outer plates occurs smoothly without the need for oiling, by virtue of the self-lubricating properties of carbon at high temperature in the carbon-impregnated ceramic cylindrical rolling bodies 48. Accordingly, the chain 40 does not require maintenance, and lubricant such as grease or the like is not needed. Thus, the chain 40 is particularly useful as a conveyor chain in applications such as food processing, where a lubricant cannot be used.

Figure 9:
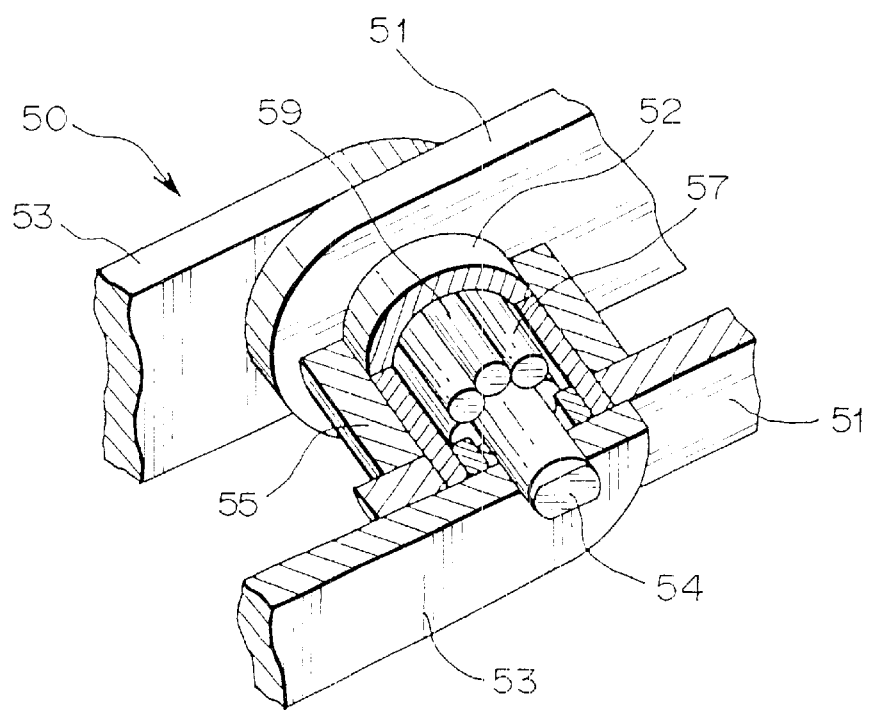
FIG. 9 is a partially cut-away perspective view of the principal portion of a chain according to a fifth embodiment of the invention.

In the chain 50 shown in FIG. 9, a pair of inner plates 51 and a pair of outer plates 53 are provided. The outer plates 53 are disposed outside the pair of inner plates 51. The inner plates 51 are connected through a hollow cylindrical bushing 52, and the outer plates 53, are connected through a pin 54 that extends through the bushing 52. Four needle-shaped, steel rolling bodies 57 and four needle-shaped, carbon-coated steel rolling bodies 59 are disposed in alternating arrangement on an outer circumferential surface of the pin 54. The bushing 52 fits on the outer circumferences of the array of needle-shaped rolling bodies 57 and 59, and a steel roller 55 fits rotatably on the outer circumferential surface of the bushing 52. In other words, the four needle-shaped, steel rolling bodies 57 and the four needle-shaped, carbon-coated steel rolling bodies 58 fit between the bushing 52 and the pin 54. In this case, the needle-shaped, carbon-coated steel rolling bodies 59 are produced by adhering carbon to the surface of needle-shaped steel rolling bodies by vapor deposition. The pair of inner plates 51 and the pair of outer plates 53 are articulably connected by the structure comprising the pin, the needle-shaped rolling bodies and the bushing.

The chain 50 uses needle-shaped, carbon-coated, steel rolling bodies 59 instead of the needle-shaped, carbon-impregnated, ceramic rolling bodies 48 in the chain 40 according to the fourth embodiment of the invention as depicted in FIG. 8.

The chain 50 can be used at a high temperature. However, when the chain 50 is used for a long period of time, the self-lubricating properties of the carbon-coated needle-shaped steel rolling body can be lost as a result of exfoliation of the carbon-coated film. Thus, needle-shaped, carbon-impregnated, ceramic rolling bodies are generally preferred over the needle-shaped, carbon-coated, steel rolling bodies. Otherwise, the chain 50 according to the fifth embodiment of the invention has substantially the same actions and effects as the chain 40 according to the fourth embodiment of the invention, and detailed explanation thereof will be omitted as unnecessary.

Figure 10:
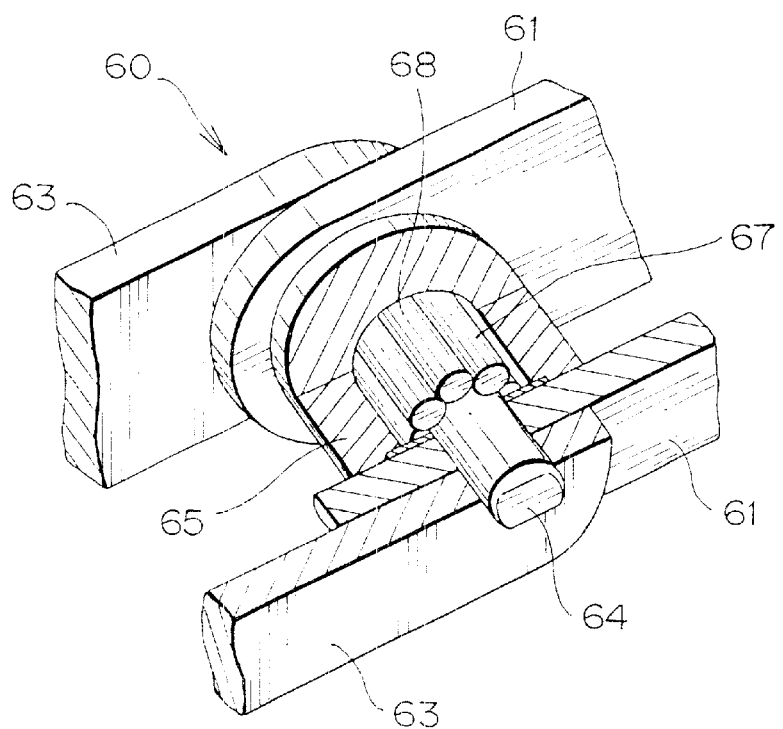
FIG. 10 is a partially cut-away perspective view of the principal portion of a chain according to a sixth embodiment of the invention.

In a chain 60 in accordance with a sixth embodiment of the invention, as shown in FIG. 10, a steel roller 65 is disposed between a pair of inner plates 61. Two outer plates 63 are disposed outside the pair of inner plates 61, and are connected by a pin 64 that extends through the inner plates 61 and the roller 65. Four needle-shaped, steel rolling bodies 67, and four needle-shaped, carbon-impregnated, ceramic rolling bodies 68 are disposed in alternating arrangement on an outer circumferential surface of the pin 64. A steel roller 65 fits rotatably on the outer circumference of the array of needle-shaped rolling bodies 67 and 68. In other words, four needle-shaped, steel rolling bodies 67 and four needle-shaped, carbon-impregnated, ceramic rolling bodies 68 are incorporated between the roller 65 and the pin 64. The pair of inner plates 61 and the pair of outer plates 63 are articulably connected to each other by the pin 64.

In the chain 60, since the four needle-shaped, steel rolling bodies 67 and the four needle-shaped, carbon-impregnated, ceramic rolling bodies 68 are incorporated between the roller 65 and the pin 64, smooth rotation of the roller is achieved, and because of the self-lubricating property of the carbon in the needle-shaped, carbon-impregnated, ceramic rolling bodies 68, the use of a lubricant is not required. Further, the self-lubricating property of the carbon in the needle-shaped, carbon-impregnated, ceramic rolling bodies 68 at high temperature permits the use of the chain in a high temperature environment. Further, the chemical resistance of carbon in the needle-shaped, carbon-impregnated, ceramic rolling body 68 permits the use of the chain in an acidic or alkaline environment.

In the chain 60, smooth rotation of the roller 65 is effected without oiling as a result of the self-lubricating property of carbon at high temperature in the needle-shaped, carbon-impregnated, ceramic rolling bodies 68. Accordingly, the chain 60 does not need maintenance, and a lubricant such as grease or the like is not necessary. Thus, the chain 60 is particularly useful as a conveyor chain in applications such as food processing, where a lubricant cannot be used.

Figure 11:
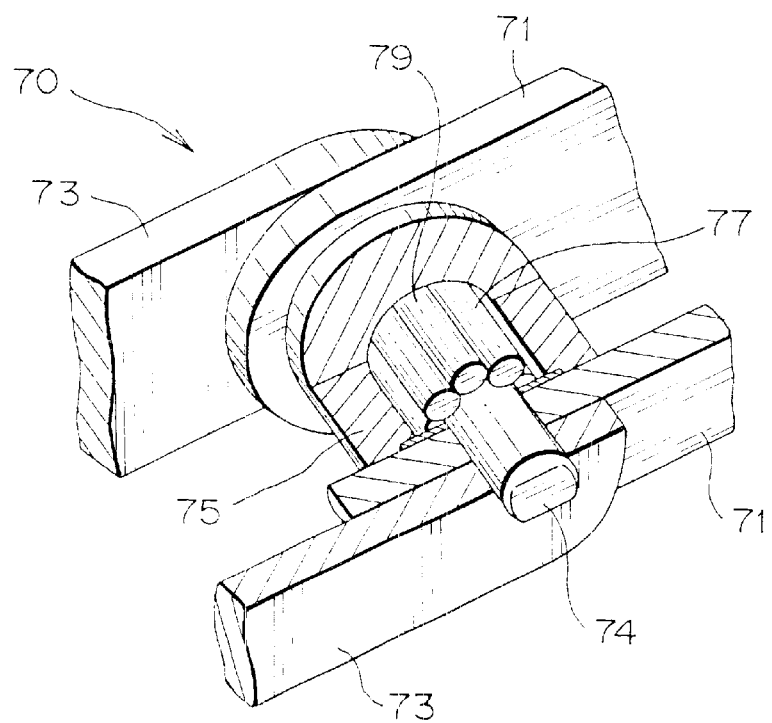
FIG. 11 is a partially cut-away perspective view of the principal portion of a chain according to a seventh embodiment of the invention.

In a chain 70 in accordance with a seventh embodiment of the invention, as shown in FIG. 11, a steel roller 75 is disposed between a pair of inner plates 71. Outer plates 73, which are disposed outside the pair of inner plates 71, are connected by a pin 74 that extends through the inner plates 71 and the steel roller 75. Four needle-shaped, steel rolling bodies 77 and four needle-shaped, carbon-coated, steel rolling bodies 79 are disposed in an alternating arrangement on an outer circumferential surface of the pin 74. A roller 75 fits rotatably on the outer circumferences of the array of needle-shaped rolling bodies 77 and 79. In other words, the four needle-shaped, steel rolling bodies 77 and the four needle-shaped, carbon-coated, steel rolling bodies 79 are disposed between the roller 75 and the pin 74. In this case, the needle-shaped, carbon-coated, steel rolling bodies 79 are produced by adhering carbon to the surfaces of needle-shaped steel rolling bodies by vapor deposition. The pair of inner plates 71 and the pair of outer plates 73 are articulably connected to each other by the pin.

The chain 70 uses needle-shaped, carbon-coated, steel rolling bodies 79 instead of the needle-shaped, carbon-impregnated, ceramic rolling bodies 68 in the chain 60 according to the sixth embodiment of the invention.

The chain 70 can be used at a high temperature. However, when the chain 70 is used for a long period of time, the self-lubricating properties of the needle-shaped, carbon-coated, steel rolling bodies 79 can be lost by exfoliation of the carbon-coated film. Thus, the needle-shaped, carbon-impregnated, ceramic rolling bodies are generally preferred over the needle-shaped, carbon-coated steel rolling bodies. Otherwise, the chain 70 according to the seventh embodiment of the invention has substantially the same actions and effects as the chain 60 according to sixth embodiment of the invention. Thus, further detailed explanation of the seventh embodiment will be omitted as unnecessary.

In the first, second, fourth and sixth embodiments of the invention, each of the cylindrical, carbon-impregnated ceramic rolling bodies or needle-shaped, carbon-impregnated, ceramic rolling bodies and each of the cylindrical steel rolling bodies or needle-shaped steel rolling bodies are disposed in an alternating arrangement. However, since the rolling of the carbon-impregnated ceramic rolling body transfers carbon onto the rolling surfaces of the bushings or pins, the inner surface of the roller and the surfaces of the adjacent steel rolling bodies, it is not necessary to use an alternating configuration in which every two successive steel rolling bodies have a carbon-impregnated ceramic rolling body interposed between them. It is possible to take advantage of the features of a carbon-impregnated rolling body, in a chain roller assembly having one such rolling body.

In the third, fifth and seventh embodiments, the cylindrical, carbon-coated, steel rolling bodies or needle-shaped, carbon-coated, steel rolling bodies and the cylindrical steel rolling bodies or needle-shaped steel rolling bodies are disposed in an alternating configuration. However, since the rolling of the carbon-coated steel rolling body causes transfer of carbon onto the rolling surfaces of the bushings or pins, it is not necessary to use an alternating configuration in which every two successive steel rolling bodies have a carbon-coated steel rolling body interposed between them. It is possible to take advantage of the features of a carbon-coated steel rolling body, in a chain roller assembly having one such rolling body.

Although, in each of the above-described embodiments, cylindrical or needle-shaped rolling body is shown, various other rolling body configurations can be used, including spherical bodies such as ball bearings, or conical bodies such as tapered roller bearings or the like. Further, the respective rolling bodies may be disposed between the roller and the bushing, between the bushing and the pin, or between the roller and the pin in a plurality of rows.

The chains described above have the following beneficial effects.

First, the heat resistance of carbon permits the use of the chain at a high temperature, and the rotation failure of the rolling bodies can be prevented by the self-lubricating properties of the roller at high temperature.

Second, rotation failure of the rolling bodies due to generation of heat by high speed rotation of the roller, when used at a normal temperature, can be prevented by the self-lubricating properties of carbon at high temperature;

Third, since lubricants intended for use at high temperature are expensive, the operating cost of the chain can be reduced by eliminating the lubricant.

Fourth, since lubricating oil is not used, scattering of the lubricating oil does not occur, which keeps the chain clean.

Fifth, the chemical resistance of carbon permits the use of the chain in an acidic or alkaline environment.

Obviously, various minor changes and modifications of the invention are possible in the light of the above teaching. It is therefore to be understood that within the scope of the appended claims, the invention may be practiced otherwise than as specifically described.

What is claimed is:

1. A roller chain having a plurality of rollers, in which at least one of said rollers is rotatable on an axis, and a structure, within said one of said rollers, comprising an annular inner surface coaxial with said axis, an element having an annular outer surface, also coaxial with said axis, the annular inner surface being rotatable on said axis relative to said annular outer surface, and said annular inner surface being opposed to, and spaced from, said annular outer surface to provide an annular space, and a plurality of rolling bodies located within said annular space, wherein at least one of the plurality of rolling bodies is a rolling body from the group consisting of carbon-impregnated ceramic rolling bodies and carbon-coated metallic rolling bodies, wherein the annular inner surface is an inner surface of said one of said rollers, said element having an annular outer surface is a bushing, and at least one of the plurality of rolling bodies is a carbon-impregnated ceramic rolling body.

2. A roller chain having a plurality of rollers, in which at least one of said rollers is rotatable on an axis, and a structure, within said one of said rollers, comprising an annular inner surface coaxial with said axis, an element having an annular outer surface, also coaxial with said axis, the annular inner surface being rotatable on said axis relative to said annular outer surface, and said annular inner surface being opposed to, and spaced from, said annular outer surface to provide an annular space, and a plurality of rolling bodies located within said annular space, wherein at least one of the plurality of rolling bodies is a rolling body from the group consisting of carbon-impregnated ceramic rolling bodies and carbon-coated metallic rolling bodies, wherein said structure within one of said rollers comprises a pin and a bushing surrounding the pin, wherein said annular inner surface is an inner surface of said bushing, said element having an annular outer surface is said pin, and at least one of the plurality of rolling bodies is a carbon-impregnated ceramic rolling body.

3. A roller chain having a plurality of rollers, in which at least one of said rollers is rotatable on an axis, and a structure, within said one of said rollers, comprising an annular inner surface coaxial with said axis, an element having an annular outer surface, also coaxial with said axis, the annular inner surface being rotatable on said axis relative to said annular outer surface, and said annular inner surface being opposed to, and spaced from, said annular outer surface to provide an annular space, and a plurality of rolling bodies located within said annular space, wherein at least one of the plurality of rolling bodies is a rolling body from the group consisting of carbon-impregnated ceramic rolling bodies and carbon-coated metallic rolling bodies, wherein the annular inner surface is an inner surface of said one of said rollers, said element having an annular outer surface is a pin, and at least one of the plurality of rolling bodies is a carbon-impregnated ceramic rolling body.

\* \* \* \* \*